United States Patent [19]
Rickenbach et al.

[11] Patent Number: 5,661,843
[45] Date of Patent: Aug. 26, 1997

[54] FIBER OPTIC PROBE

[75] Inventors: Robert Rickenbach, Thousand Oaks; Ronald Gene Boyer, Camarillo, both of Calif.

[73] Assignee: Rifocs Corporation, Camarillo, Calif.

[21] Appl. No.: 593,786

[22] Filed: Jan. 30, 1996

[51] Int. Cl.[6] ............................................ G02B 6/00
[52] U.S. Cl. .................... 385/147; 385/25; 385/77; 385/78; 385/81; 385/87; 385/139
[58] Field of Search ........................ 385/25, 55, 56, 385/60, 62, 66, 70, 76, 77, 78, 81, 84, 87, 136, 137, 138, 139, 147

[56] References Cited

U.S. PATENT DOCUMENTS

| | | |
|---|---|---|
| 4,435,036 | 3/1984 | Sasakawa ............... 385/81 X |
| 4,909,589 | 3/1990 | Morris .................... 385/25 X |
| 5,101,463 | 3/1992 | Cubukciyan et al. .......... 385/72 |
| 5,110,224 | 5/1992 | Taylor et al. ................ 385/25 |
| 5,134,280 | 7/1992 | Johnston et al. .......... 385/81 X |
| 5,142,600 | 8/1992 | Ortiz, Jr. ..................... 385/83 |
| 5,212,752 | 5/1993 | Stephenson et al. .......... 385/78 |
| 5,222,169 | 6/1993 | Chang et al. ................. 385/87 |
| 5,265,183 | 11/1993 | Feng et al. ................... 385/78 |
| 5,337,379 | 8/1994 | Gieryng ....................... 385/26 |
| 5,446,808 | 8/1995 | Kuzyk et al. ............. 385/25 X |
| 5,448,662 | 9/1995 | Kittell et al. ................. 385/25 |
| 5,515,466 | 5/1996 | Lee ............................. 385/78 |
| 5,542,012 | 7/1996 | Fernandes et al. ........... 385/25 |
| 5,548,674 | 8/1996 | Rondeau ...................... 385/72 |

*Primary Examiner*—Brian Healy
*Attorney, Agent, or Firm*—Michaelson & Wallace

[57] ABSTRACT

The present invention provides a fiber optic test probe comprising a ferrule having a longitudinal axis and a fixable position and being transversely displaceable, and a gimbal coupled to the ferrule and being transversely displaceable, the gimbal comprising means for constraining transverse displacement of the ferrule from a fixed position.

59 Claims, 4 Drawing Sheets

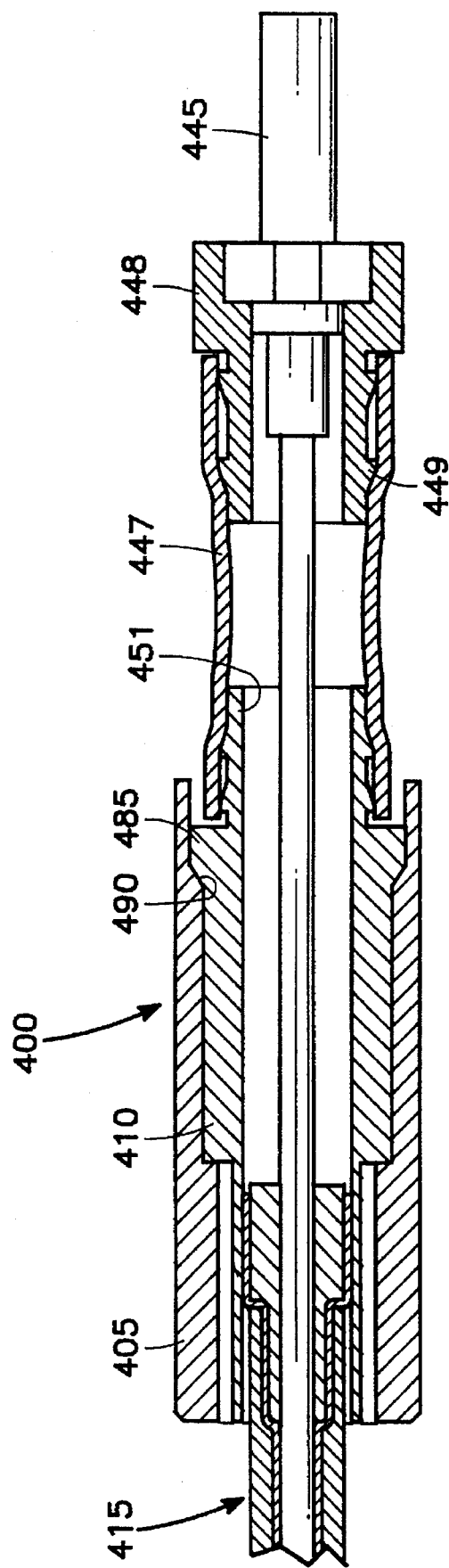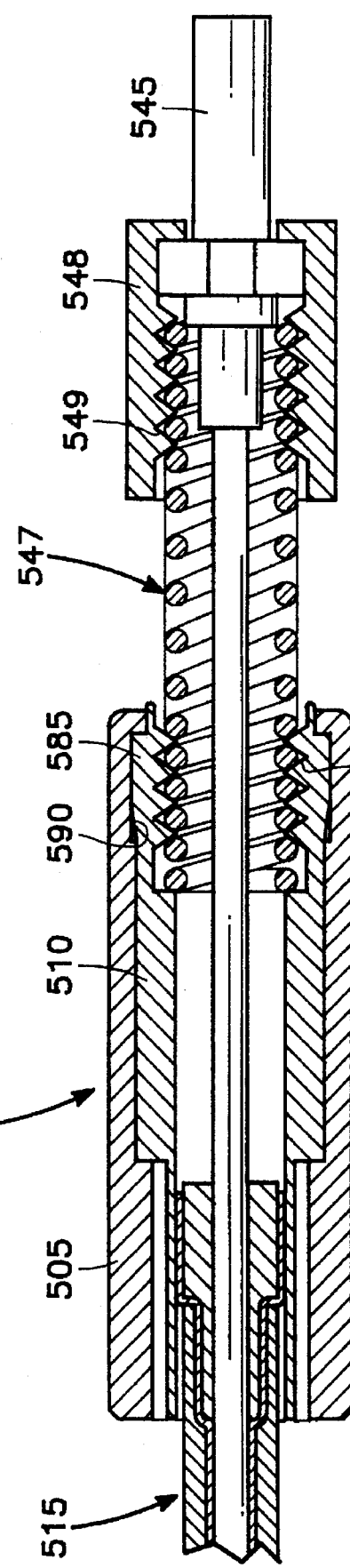
FIG. 4
FIG. 5

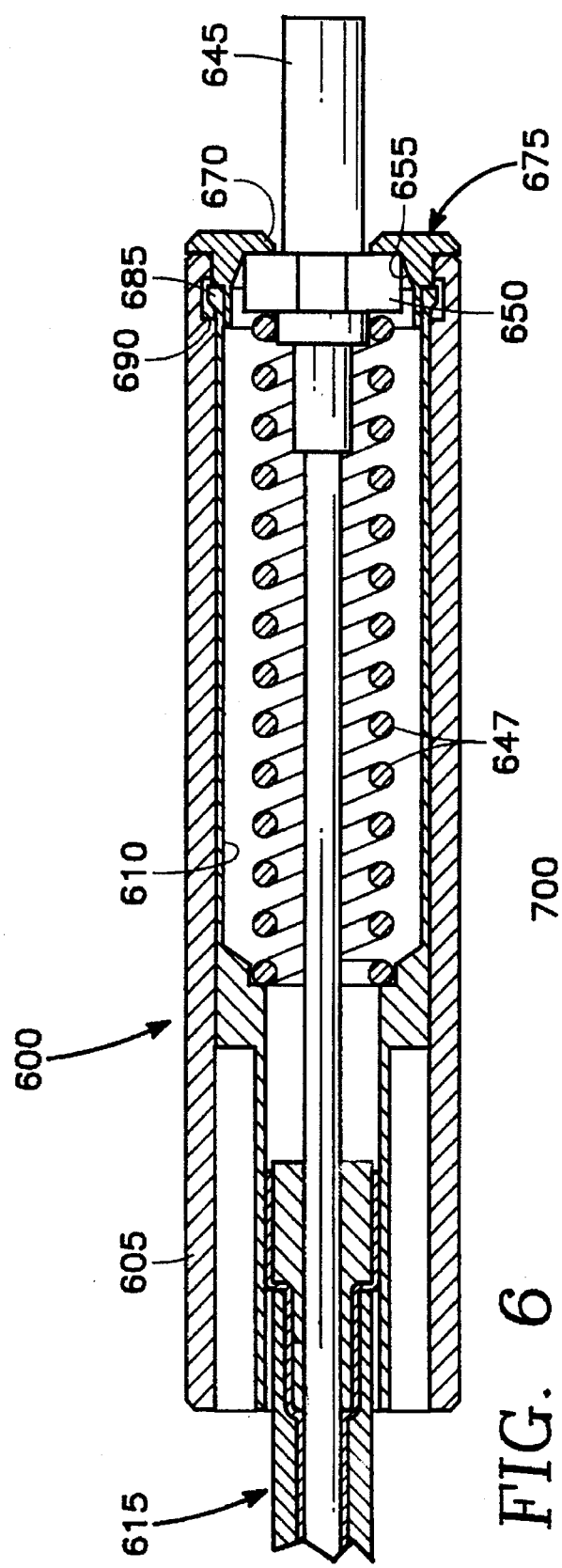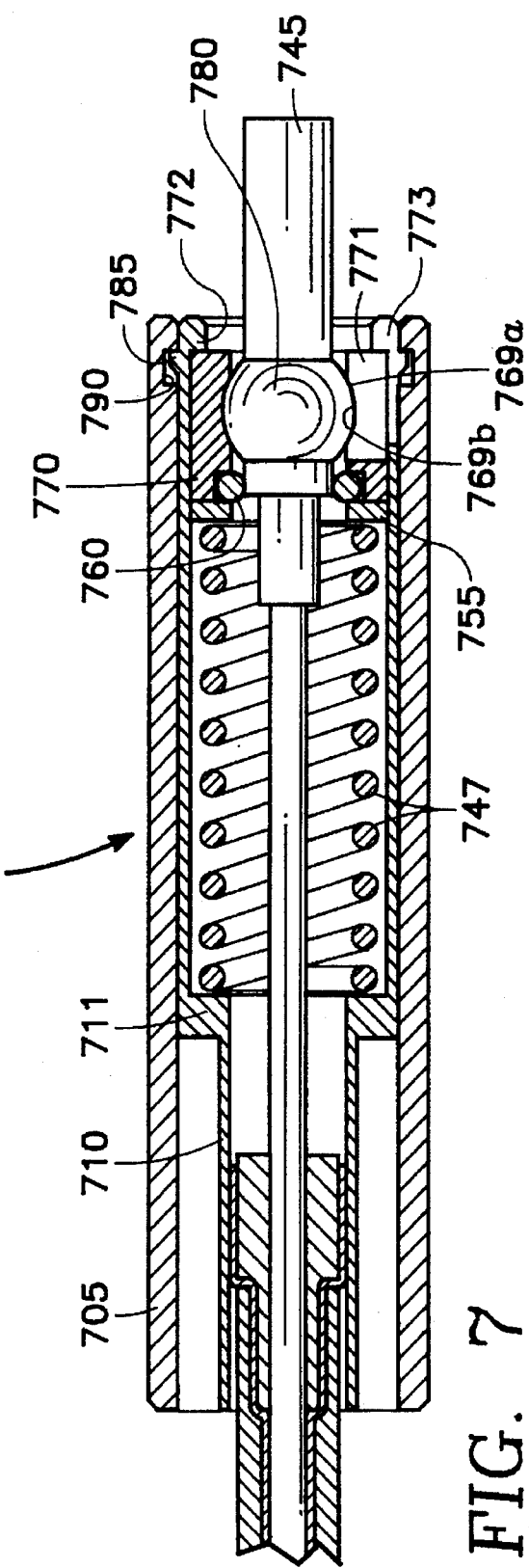

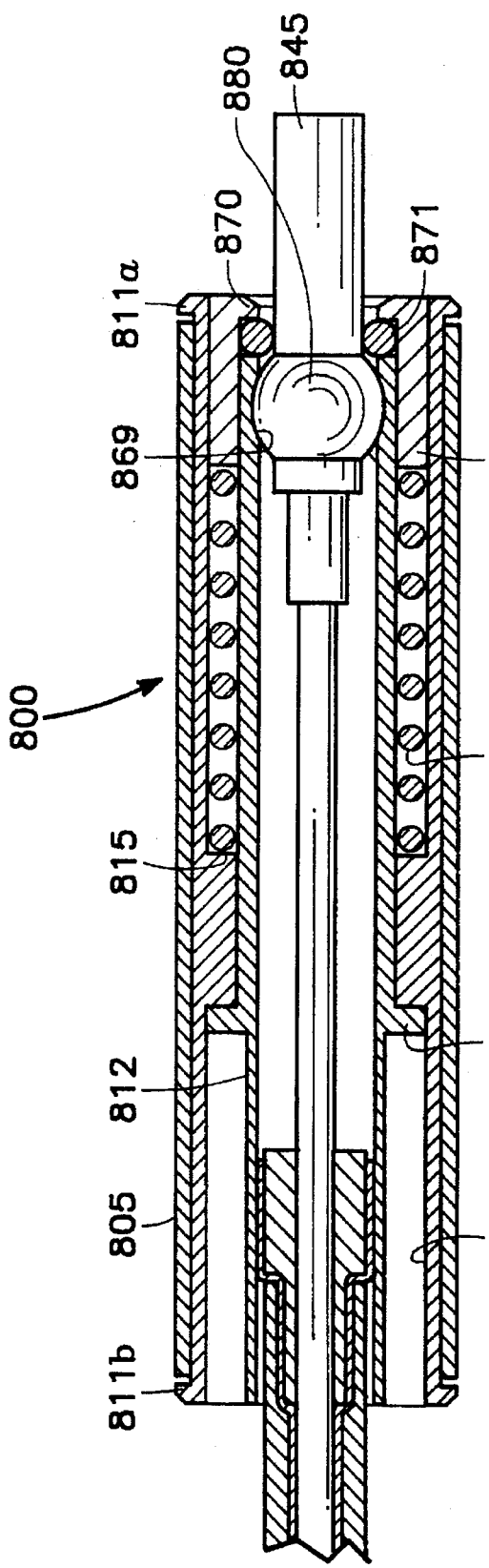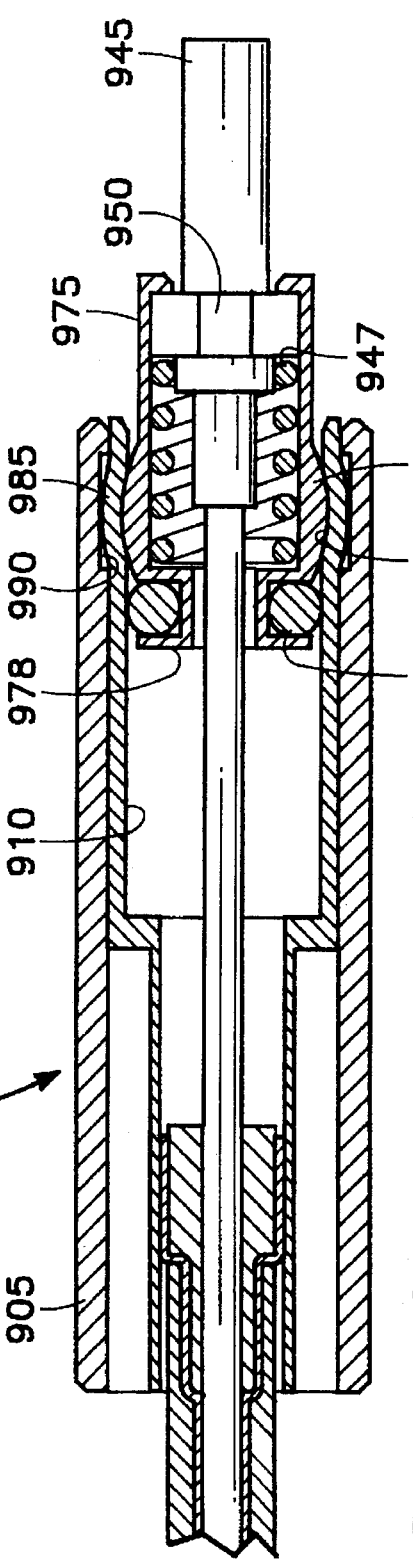
FIG. 8
FIG. 9

FIBER OPTIC PROBE

BACKGROUND OF THE INVENTION

1. Technical Field

The present invention relates to a compact probe to test fiber optic lines that is capable of maintaining low transmission losses while the probe is moved relative to the line under test.

2. Background Art

In testing fiber optic lines, test cables are used to provide optical connection between the line under test and the test instrumentation. These test cables are comprised of a connector compatible with the line under test, an interface cable and a connector compatible with the test instrument. Since the fiber lines under test typically terminate in unique connectors, test technicians frequently must carry many different test cables in order to match the connectors to be tested in the field. The cost and inconvenience of maintaining a variety of test cables is a major disadvantage of current fiber optic test cables.

This compatibility problem is exacerbated by multipin connectors that are often used in fiber optic installations. As shown in FIG. 1, the fiber lines to be tested may terminate in a four pin male plug 100, which requires a test cable 105 that has a four pin female connector 110 that is compatible with the plug 100. Since there is a wide range of optical connector types and sizes, the costs of acquiring compatible test cables can be substantial.

In addition, current test cables are time-consuming to use and maintain. The process of properly mating male and female multipin connectors, such as a bayonet style connector, is very time-consuming. In addition, some types of connectors, such as a screw type connector, have mating surfaces that must be cleaned frequently to assure a secure connection. These are additional disadvantages of conventional fiber optic test cables.

As shown in FIG. 2, one solution that has been proposed is the use of a probe 200 consisting of a single fiber optic cable 205 terminated in a probe ferrule 210 that is mounted in a grip 215. When the probe 200 is inserted in a connector 220 to be tested, it typically engages a sleeve 225, made of for example ceramic or metal, in which a test ferrule 230 is mounted. An exemplary probe of this design is made by Glenair Corporation of Glendale, Calif.

The use of a probe of this design displays several disadvantages. When a user inserts the probe 200 into the connector 220, a rotation motion about the axis of the probe 200 frequently occurs which causes the faces of the probe ferrule 210 and test ferrule 230 to grind against one another. Such a grinding motion easily scratches the optical transmission surfaces of the ferrules 210 and 230, which increases transmission losses.

This grinding can also affect reliability of the probe 200 because of the stresses that can arise at the contacting surfaces of the ferrules 210 and 230. These surfaces consist primarily of the glass cores of the fiber optic cable, which may have a diameter as small as 8–9 microns. Consequently, even modest shear forces from rotation will produce high localized stress over such small contacting area. These stresses can cause cracking of the glass core and protective cladding and failure of the optical connection.

In addition, transverse (or skew) forces F may be applied to the probe 200 during the insertion or test process. The affect of these forces F on the ferrules 210 and 230 is increased because the forces are applied to the grip 215 of the probe 200, which results in a mechanical advantage compared to the length of the ferrules. These forces F will cause axial misalignment of the ferrules 210 and 230 that degrades the optical connection between the ferrules and results in transmission losses. This result jeopardizes the integrity of test process. Further, if the forces F are large, the sleeve 225 may break rendering the connector 220 useless.

An additional disadvantage of probes of this design is that longitudinal forces on the grip 215 are transmitted to the ferrule 210. Since the ferrule 230 is, stationary compression forces will develop and the contacting surfaces of the ferrules 210 and 230, which forces can fracture the glass cores of the fiber optic cables.

SUMMARY OF THE INVENTION

The present invention provides a fiber optic test probe comprising a ferrule having a longitudinal axis and a fixable position and being transversely displaceable, and a gimbal coupled to the ferrule and being transversely displaceable, the gimbal comprising means for constraining transverse displacement of the ferrule from a fixed position.

BRIEF DESCRIPTION OF THE DRAWINGS

FIG. 4 is a cross section side view of a second embodiment of an optical test probe according to the invention.

FIG. 5 is a cross section side view of a third embodiment of an optical test probe according to the invention.

FIG. 6 is a cross section side view of a fourth embodiment of an optical test probe according to the invention.

FIG. 7 is a cross section side view of a fifth embodiment of an optical test probe according to the invention.

FIG. 8 is a cross section side view of a sixth embodiment of an optical test probe according to the invention.

FIG. 9 is a cross section side view of a seventh embodiment of an optical test probe according to the invention.

DETAILED DESCRIPTION OF THE PREFERRED EMBODIMENT

Figure 3:
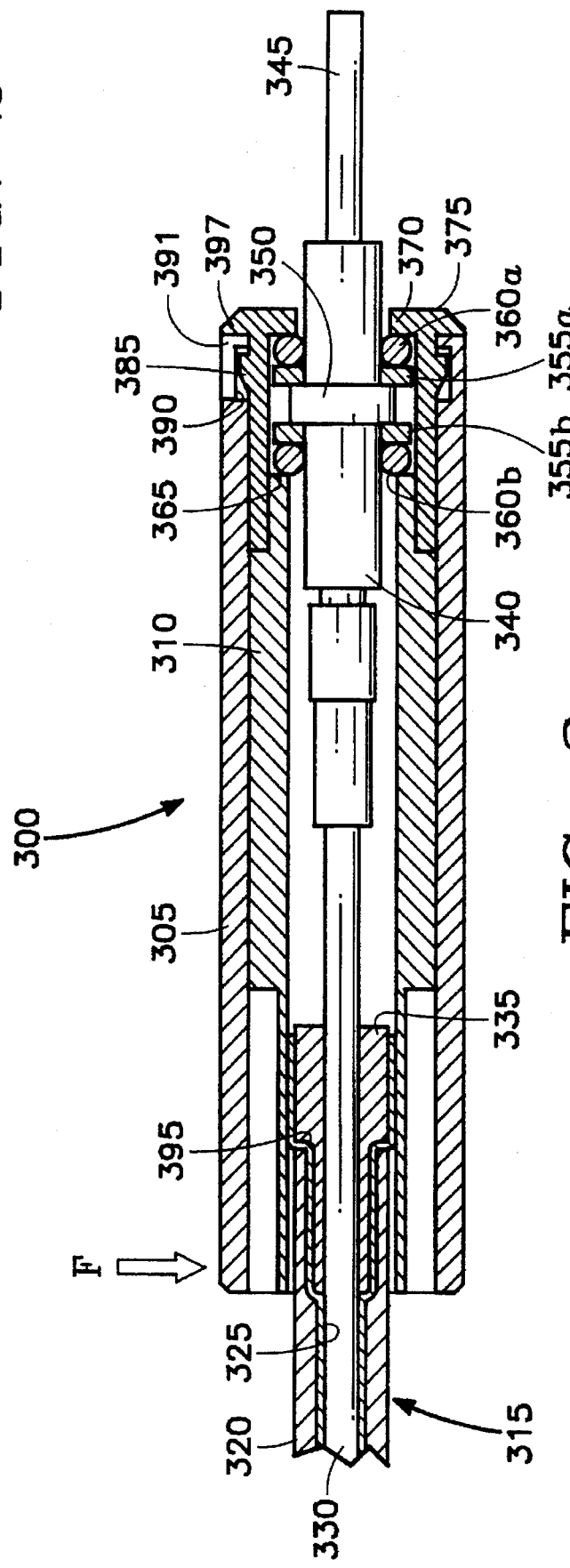
FIG. 3 is a cross section side view of an optical test probe according to the invention.

A first embodiment of the invention is shown in FIG. 3 and consists of a probe 300 having a rotating grip 305. A crimp housing 310 is mounted concentrically with a slip fit inside the grip 305. A conventional fiber optic cable 315 is positioned inside the housing 310, and the cable 315 consists of an outer protective jacket 320, a strength member 325, and a buffered fiber 330 that houses a glass fiber, which carries the optical signals. Most of the strength of the cable 315 is provided by the strength member 325, which is typically made of a braided or stranded polymeric material, such as Kevlar made by the E.I. DuPont DeNemours and Company, Inc. of Wilmington, Del.

A strain relief bushing 335, having an inner diameter approximately equal to the buffered fiber 330 diameter, is disposed over the buffered fiber and under the strength member 325 and the jacket 320 near a cable entry end of the housing 310. The thickness of the housing 310 at the cable entry end is selected to be easily compressed to provide a compression, or crimp, fit of the jacket 320 and strength member 325 against the bushing 335. In addition, or alternatively, the jacket 320 should be secured to the housing 310 by conventional adhesive means, such as epoxy. This design transfers any stress on the cable 315 to the housing 310 and reduces stress on the cladding 330 inside the housing 310.

The portion of the buffered fiber 330 inside the housing 310 engages a conventional spring loaded ferrule assembly 340, such as those made by Deutsch, Ltd. of Sussex, England. The assembly 340 terminates the buffered fiber 330 in a ferrule 345 and provides a spring bias that enables the ferrule 345 to translate in the longitudinal direction while maintaining the optical connection between the buffered fiber 330 and ferrule 345.

Typically, the assembly 340 is provided with a collar 350 against which washers 355A and 355B are disposed. O-rings 360A and 360B are disposed on a side of each washer 355 opposite the collar 350. The washers 355 are used to prevent migration of the o-rings 360 along the body of the assembly 340. It should be appreciated that if the collar 350 has a large enough diameter to restrain the o-rings 360, the washers 355 would not be required.

O-ring 360B is disposed against a shoulder 365 of the housing 310 and o-ring 360A is disposed against an inwardly facing flange 370 of a retaining ring 375. The ring 375 is engaged by a compression fit with a reduced diameter portion 380 of the housing 310 in order that the outer diameters of the housing 310 and ring 375 are approximately equal and provide a loose fit with the inner diameter of housing 310. The ring 375 restrains the o-rings 360, washers 355 and collar 350 from separating from the housing 310.

The ring 375 also provides the means by which the grip 305 may rotate about the axis of the ferrule 345 while the ferrule remains stationary. A chamfered shoulder 385 on the ring 375 engages an inwardly disposed groove 390 on the grip 305. One or more slots 391 allow expansion of the grip 305 to snap over the shoulder 385. The engagement of the shoulder 385 with the groove 390 restrains longitudinal movement of the grip 305 but it allows rotational movement of the grip 305 in relation to the housing 310 and ring 375. Although the shoulder 385 is shown formed on the ring 375, it could be formed on other components of the probe 300, for example on the housing 310. Since the groove 390 must be adjacent the shoulder 385, the groove would be formed in a different position on the grip 305 if the shoulder 385 were moved.

A probe 300 according to the first embodiment of the invention is assembled by initially preparing the optical cable 315. A length of the jacket 320, for example 35 mm, is stripped away to expose a length of the buffered fiber 330, for example 30 mm, that is adequate to engage the assembly 340 and terminate in the ferrule 345. In addition, a length of strength member 325 is exposed, for example 5 mm, to allow it to be crimped or bonded separately from any crimping of the jacket 320. The grip 305 and housing 310 are then slid over the cable 315, although this step could be performed prior to the cable preparation.

The bushing 335 and assembly 340, with o-rings 360 and washers 355, are then slid over the cable 315 and the ferrule 345 is bonded to the buffered fiber 330. The bushing 335 is then slid under the strength member 325, the strands or braids of which have been loosened to allow the bushing to slide thereunder. The housing 310 is then slid over the assembly 340 until shoulder 365 abuts the o-ring 360B. The cable entry end of the housing 310 is then compressed inwardly pressing the strength member 325 and jacket 320 against the bushing 335. As shown in FIG. 3, the outer diameter of the bushing 335 could be provided with a step 395 to allow the strength member 325 to be crimped against the bushing 335 separately from the crimping of a combination of the strength member 325 and jacket 320 against the bushing 335.

The ring 375 is then press fit onto the housing 310 and flange 370 abuts the o-ring 360A. The ring 375 may also be provided with a flange 397 to restrict longitudinal displacement of the grip 305. Finally, the grip 305 is slid over the housing 310. The slots 391 allow the inner diameter of the grip 305 to expand as the grip snaps over the chamfered shoulder 385, engaging the groove 390.

A probe 300 of the first embodiment of the invention is used by gripping the grip 305 and placing the ferrule 345 adjacent a connector of the optic line to be tested. The ferrule 345 is inserted into the connector. Rotation of the grip 305 is not necessary to obtain optical connection, but if any rotation occurs, it will not result in rotation of the ferrule 345 because of the slip fit of the housing 310 over the grip 305, a "rotating grip" feature.

This rotating grip feature of the invention achieves a first object of the invention because any unintended rotation of the grip 305 will not cause the ferrule 345 to rotate, which avoids any marring or scratching of the optical surfaces of the glass cores of either ferrule 345 or the ferrule of the connector. This reduces transmission losses during a particular test, and subsequent tests by reducing marring on the ferrule 345. This rotating grip feature also improves reliability of the probe 300 by reducing the possibility of cracking the glass fibers due to high stresses at the optical interface because of the rotation.

A second object of the invention, to isolate the ferrule 345 from pivoting of the grip 305, an "anti-pivot" feature, is realized by an interaction/ of the o-rings 360, the housing 310 and the ring 375. Specifically any pivot motion of the grip 305 in a range of angles about an axis of the probe 300, for example up to approximately 25 degrees, will be absorbed by o-rings 360 and the assembly 340 and ferrule 345 will not move. For example, if the grip 305 is moved downward or to one side by a pivot force F, one side of the o-ring 360B will be compressed by the assembly 340 and an opposite side of o-ring 360A will also be compressed. When the force F is removed, the compressed sides of the o-rings 360 will expand which will return the grip 305 to a coaxial relation with the ferrule 345, i.e., a "self-centering" function.

Figure 1:
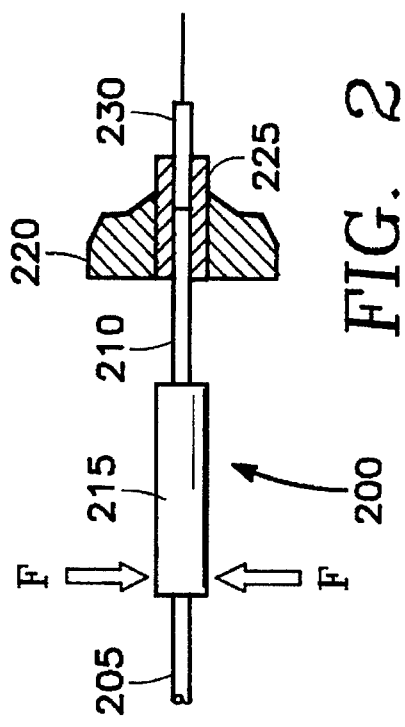
FIG. 1 is a block diagram of a prior art optical test cable.
Figure 2:
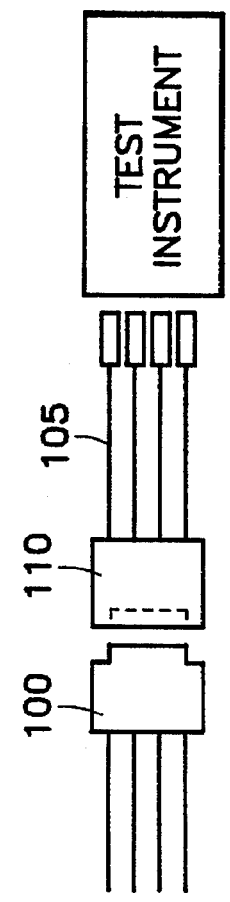
FIG. 2 is a block diagram of a prior art optical test probe.

This isolation of the ferrule 345 from pivot motions of the grip 305 prevents the ferrule 345 from becoming misaligned with the ferrule under test, which reduces transmission losses. In addition, this anti-pivot feature reduces strain on the connector under test and breakage of the sleeve 225 in such connectors (shown in FIG. 2).

A probe 300 of the first embodiment also achieves the object of preventing any longitudinal stresses and strains on the cable 315 and grip 305 from being transmitted to the ferrule 345, i.e., a "longitudinal isolation" feature. This object of isolating the ferrule 345 from axial stresses and strains is realized by use of the assembly 340 which absorbs axial forces by spring means. By preventing such forces from being transmitted to the ferrule 345, compression forces on the optical interfaces are avoided and marring or fracturing of the glass fiber is avoided.

As one skilled in the art can appreciate, these objects can be achieved with other embodiments of the invention. For example, a second embodiment is shown in FIG. 4 which illustrates a probe 400 with many similar features to the first embodiment. For example, a rotating grip 405 is positioned concentrically over a crimp housing 410, which serves the same purpose of providing strain relief for a fiber optic cable 415. The cable 415 passes through the housing 410 and may be terminated directly in a ferrule 445. The end of the ferrule 445 opposite the optical face is attached to a flexible tube 447 by conventional mechanical means such as a compression fitting 448 or by adhesive means. An end of the tube 447 adjacent the ferrule 445 is attached to the compression fitting 448 by an expansion flange 449. An end of the tube 447 opposite the ferrule 445 is attached to the housing 410 by conventional mechanical means such as an expansion flange 451 or by adhesive means.

The probe 400 of the second embodiment of the invention also achieves all of the objects of the invention. The isolation of the ferrule 445 from rotation of the grip 405, i.e., the rotating grip feature, is realized in the same manner as the first embodiment by a loose fit of the grip 405 over the housing 410, with longitudinal motion of the grip with respect to the housing restrained by a chamfered shoulder 485 and groove 490. The shoulder 485 is shown formed on the housing 410, although it could be disposed on other components, such as for example on a compression ring placed over a housing contacting end of the tube 447.

The isolation of the ferrule 445 from pivot movement of grip 405, i.e., the anti-pivot feature, is accomplished by the tube 447 that absorbs pivot strains by flexing to one side or the other without transmitting this motion to the ferrule 445. The object of isolating the ferrule 445 from longitudinal strains, i.e., the longitudinal isolation feature, is also accomplished by the tube 447 that compresses under such strains, but does not transmit them to the ferrule 445. This object could be enhanced by using a spring loaded ferrule assembly, such as the assembly 340 in FIG. 3, inside the housing 410.

A third embodiment of the invention is shown in FIG. 5 which illustrates a probe 500 with many similar features to the first and second embodiments. Again, a rotating grip ring 505 is disposed with a slip fit over a crimp housing 510 and a cable 515 is secured at an end of the housing with a crimp fit or by adhesive means. In place of the tube 447 used in the second embodiment (shown in FIG. 4), however, one end of a compression spring 547 is attached to an end of the housing 510 by conventional mechanical means such as a spring receiving threads 551 or by adhesive means. An end of a ferrule 545 opposite the optical face is attached to the spring 547 by conventional, mechanical means such as a ferrule retainer 548, using spring receiving threads 549, or by adhesive means.

The probe 500 also achieves all of the objects of the invention. The rotating grip feature is realized by the slip fit of the grip 505 over the housing 510, with longitudinal motion of the grip with respect to the housing restrained by a chamfered shoulder 585 and groove 590. The anti-pivot feature is achieved by the spring 547 that absorbs pivot strains by flexing to one side or the other without transmitting this motion to the ferrule 545. The longitudinal isolation feature the spring 547 that compresses under such strains, but does not transmit them to the ferrule 545.

A fourth embodiment of the invention is illustrated in the probe 600 shown in FIG. 6. Again, this embodiment incorporates many similar features of the first embodiment. A rotating grip ring 605 is disposed with a slip fit over a crimp housing 610 and a cable 615 is secured at an end of the housing with a crimp fit or by adhesive means. As described in the discussion of the first embodiment of the invention, a chamfered shoulder 685 is formed in the housing 610, rather than in a retaining ring 675. (In the probe 300, the chamfered shoulder 385 was formed in the retaining ring 375 as shown in FIG. 3).

A ferrule 645 having a shoulder 650 is pressed against a flange 670 of the ring 675 by a compression spring 647. Some commercial ferrules 645 are sold with an integrated shoulder 650 and other ferrules may require that such a shoulder be added, for example by press fitting a shoulder over the ferrule. The ring 675 is provided with a taper 655 to allow the shoulder 650 to pivot or rock about an axis of the probe 600.

The probe 600 also accomplishes all of the objects of the invention. The rotating grip feature is achieved by the slip fit of the grip 605 over the housing 610, with longitudinal motion of the grip with respect to the housing restrained by the shoulder 685 and groove 690. The anti-pivot feature is achieved by a cooperation between the shoulder 650, the taper 655 and the spring 647. When the grip 605 is pivoted about the ferrule 645, i.e., rotated about a transverse axis, the ring 675 absorbs this pivot strain by rocking to one side or the other with respect to the shoulder 650 without transmitting this motion to the ferrule 645. After the pivot stress is removed, the spring 647 reseats the shoulder 650 on the flange 670, or self-centers the grip 605 in relation to the ferrule 645. The longitudinal isolation feature is provided by the spring 647 that compresses under longitudinal displacements, but does not transmit them to the ferrule 645.

A fifth embodiment of the invention is illustrated in a probe 700 as shown in FIG. 7, which has many similar features to those of previous embodiments. In this embodiment, the rotational feature is provided by a slip fit of a grip 705 over a housing 710. A chamfered shoulder 785 is formed in the housing 710 and interlocks with an adjacent groove 790 to prevent longitudinal displacement of the grip 705 with respect to the housing.

The anti-pivot feature is accomplished by cooperation of opposed arcuate surfaces 769A and 769B formed on an interior portion of a split socket 770, which is slip fit inside the housing 710, and an exterior portion of a formed collar 780 of a ferrule 745. A slot 771 is provided in the socket 770 to allow it to be expanded to snap over the collar 780 during assembly. An axial slot 773 is provided at an end of the housing 710 to allow the housing to expand over the socket 770 during assembly of the socket into the housing. The mating surfaces 769 are dimensioned to form a slip fit and absorb pivot displacements by sliding over one another. As used herein, the term "arcuate surfaces" means a portion of any arcuate surface of revolution, such as a sphere, spheroid, paraboloid or hyperboloid.

After a pivot force is removed, a ferrule-centering force is provided by an o-ring 760, one side of which will be compressed during application of the pivot force. When the pivot force is subsequently removed, the compressed side of the o-ring 760 will expand, thus restoring a coaxial position of the ferrule 745. The o-ring 760 is prevented from moving by conventional means such as a washer 755 or by an inwardly facing flange formed on the socket 770.

The longitudinal isolation feature is provided in probe 700 by a compression and an expansion of a spring 747 between the washer 755 and a reduced diameter section 711 of housing 710. During a longitudinal displacement of the grip 705 with respect to the ferrule 745, the socket 770 slides along the interior surface of the housing 710.

A sixth embodiment of the invention is illustrated in a probe 800 as shown in FIG. 8, which has many similar features to the previous embodiment shown in FIG. 7. In the probe 800 of FIG. 8, the rotational feature of the invention is also provided by a slip fit of a grip 805 over a sleeve 810. Rather than using an interlocking shoulder and groove to prevent the grip 805 from migrating along the sleeve, 810, however, a lip 811A is formed on one end of the sleeve 810. After the grip 805 is assembled over the housing, the other end of the sleeve 810 is swaged outwardly to form a lip 811B, which lips restrain the grip. Alternatively, lips 811 could be preformed at both ends of the sleeve and the grip 805 could be provided with a longitudinal slot along its length. The grip 805 could then be expanded by means of the slot to fit over the sleeve 810, and be restrained at both ends of the sleeve by the preformed lips 811.

The anti-pivot feature of the invention is accomplished by a similar method to that used in the previous embodiment. In the probe 800, sliding arcuate surfaces 869 are formed on a formed collar 880 on a ferrule 845 and an interior surface of a crimp housing 812. A pivoting motion of the grip 805 causes the housing 812 to rotate about the collar 880, isolating the ferrule 845 from the pivot motion. Again, an o-ring 871 provides a restoring force to return the ferrule 845 to a coaxial position. The o-ring 871 is prevented from moving by conventional means such as a flange 870 on a retaining ring 875. The ring 875 is secured to the housing 812 by conventional means such as a press fit, forming a "ring and housing assembly".

The longitudinal isolation feature of the invention is provided in probe 800 by a compression and an expansion of a spring 847 between one end of the retaining ring 875 and a reduced diameter portion 815 of the sleeve 810. During a longitudinal displacement of the grip 805 with respect to the ferrule 845, the ring and housing assembly slides along the interior surface of the sleeve 810, which motion is constrained by a flange 817 abutting portion 815.

A seventh embodiment of the invention is illustrated in a probe 900 as shown in FIG. 9, which has many similar features to the previous embodiment shown in FIG. 8. In the probe 900 of FIG. 9, the rotational feature of the invention is also provided by a slip fit of a grip 905 over a housing 910. An interlocking shoulder 985 and groove 990 is used to prevent the grip 905 from migrating along the housing 910.

The anti-pivot feature of the invention is accomplished by a similar method to that used in the previous embodiment. In the probe 900, sliding arcuate surfaces 969 are formed on an exterior collar 970 of a ferrule retainer 975 and an interior surface of the housing 910. A pivoting motion of the grip 905 causes the housing 910 to rotate about the retainer 975, isolating a ferrule 945 from the pivot motion. Again, an o-ring 971 provides a restoring force to return the ferrule 945 to a coaxial position. The o-ring 971 is prevented from moving by a channel 978 formed in the retainer 975.

The longitudinal isolation feature of the invention is provided in probe 900 by a compression and an expansion of a spring 947 between a collar 950 on the ferrule 945 and the channel 978, in a manner similar to that used in the fourth embodiment of the invention (shown in FIG. 6). During a longitudinal displacement of the grip 905 with respect to the ferrule 945, the ferrule slides along the interior surface of the retainer 975 during compression and expansion of the spring 947.

Although the present invention has been described with reference to preferred embodiments, workers skilled in the art will recognize that changes may be made in form and detail without departing from the spirit and scope of the invention.

What is claimed:

1. A fiber optic test probe comprising:
   a ferrule having a longitudinal axis and a fixable position and being transversely displaceable; and
   a gimbal coupled to said ferrule and being transversely displaceable, said gimbal comprising means for constraining transverse displacement of said ferrule from a fixed position.

2. The probe of claim 1 wherein said transverse constraining means comprises:
   a housing coupled to said ferrule;
   an annular compressible means disposed medial said ferrule and said housing restoring said gimbal to a coaxial relation with said ferrule from a transversely displaced position.

3. The probe of claim 2 wherein said transverse constraining means further comprises:
   a plurality of annular compressible means.

4. The probe of claim 3 wherein said annular compressible means is longitudinally displaceable, said transverse constraining means further comprising:
   a plurality of collars coupled to said ferrule and disposed mediate said annular compressible means, said collars comprising means for constraining longitudinal displacement of said annular compressible means.

5. The probe of claim 2 wherein said annular compressible means comprises a compressible o-ring.

6. The probe of claim 2 wherein said annular compressible means is longitudinally displaceable, said transverse constraining means further comprising:
   a retaining ring coupled to said housing, said ring comprising means for constraining longitudinal displacement of said annular compressible means.

7. The probe of claim 2 wherein said housing further comprises:
   a fiber optic cable coupled to said ferrule and forming a cable junction; and
   a strain relief collar at an end of said housing opposite said ferrule, said collar comprising means for transferring stress from said cable junction to said housing.

8. The probe of claim 7 wherein said stress transferring means comprises:
   a deformable portion of said housing exerting radial compression forces.

9. The probe of claim 8 further comprising:
   a bushing coaxially mounted under said deformable portion opposing said compression forces.

10. The probe of claim 1 wherein said ferrule is rotationally displaceable, said probe further comprising:
    a grip coupled to said ferrule and being rotationally displaceable, said grip comprising means for constraining rotation of said ferrule from a fixed position.

11. The probe of claim 10 wherein said rotational constraining means is longitudinally displaceable, said rotational constraining means comprises:
    a housing coupled to said ferrule; and
    an interlock coupled to said housing, said interlock comprising means for constraining longitudinal displacement of said grip.

12. The probe of claim 11 wherein said longitudinal constraining means comprises:
    an inwardly facing groove in said grip; and
    an interlocking shoulder adjacent said groove on said housing.

13. The probe of claim 11 wherein said longitudinal constraining means comprises:
    an inwardly facing groove in said grip; and
    a retaining ring coupled to said housing and having an interlocking shoulder adjacent said groove.

14. The probe of claim 11 wherein said longitudinal constraining means comprises:

an outwardly facing lip at an end of said housing abutting an end of said grip; and an outwardly facing lip at another end of said housing abutting another end of said grip.

15. The probe of claim 1 wherein said ferrule is longitudinally displaceable, said probe further comprising:

an assembly coupled to said ferrule and being longitudinally displaceable, said assembly comprising means for constraining longitudinal displacement of said ferrule from a fixed position.

16. The probe of claim 1 wherein said transverse constraining means comprises:

a flexible tube having an end coupled to said ferrule.

17. The probe of claim 16 further comprising:

a housing coupled to another end of said tube;

a fiber optic cable coupled to said ferrule and forming a cable junction; and a strain relief collar at an end of said housing opposite said ferrule, said collar comprising means for transferring stress from said cable junction to said housing.

18. The probe of claim 17 wherein said stress transferring means comprises:

a deformable portion of said housing for exerting radial compression forces.

19. The probe of claim 16 wherein said ferrule is rotationally displaceable, said probe further comprising:

a grip coupled to said ferrule and being rotationally displaceable, said grip comprising means for constraining rotation of said ferrule from a fixed position.

20. The probe of claim 19 wherein said rotational constraining means is longitudinally displaceable, said rotational constraining means comprises:

a housing coupled to another end of said tube; and an interlock coupled to said housing, said interlock comprising means for constraining longitudinal displacement of said grip.

21. The probe of claim 16 wherein said ferrule is longitudinally displaceable, said tube comprising means for constraining longitudinal displacement of said ferrule from a fixed position.

22. The probe of claim 1 wherein said transverse constraining means comprises:

a spring means having an end coupled to said ferrule.

23. The probe of claim 22 further comprising:

a housing coupled to another end of said spring means;

a fiber optic cable coupled to said ferrule and forming a cable junction; and a strain relief collar at an end of said housing opposite said ferrule, said collar comprising means for transferring stress from said cable junction to said housing.

24. The probe of claim 23 wherein said stress transferring means comprises:

a deformable portion of said housing for exerting radial compression forces.

25. The probe of claim 22 wherein said ferrule is rotationally displaceable, said probe further comprising:

a grip coupled to said ferrule and being rotationally displaceable, said grip comprising means for constraining rotation of said ferrule from a fixed position.

26. The probe of claim 25 wherein said rotational constraining means is longitudinally displaceable, said rotational constraining means comprises:

a housing affixed to another end of said spring means; and an interlock coupled to said housing, said interlock comprising means for constraining longitudinal displacement of said grip.

27. The probe of claim 22 wherein said ferrule is longitudinally displaceable, said spring means comprising means for constraining longitudinal displacement of said ferrule from a fixed position.

28. The probe of claim 1 wherein said ferrule having a raised shoulder, said transverse constraining means comprises:

a housing coupled to said ferrule; and a retaining ring coupled to said housing and having a taper constraining transverse displacement of said raised shoulder about said longitudinal axis.

29. The probe of claim 28 wherein said transverse constraining means further comprises:

a spring means biasing said raised shoulder against an edge of said taper.

30. The probe of claim 28 further comprising:

a fiber optic cable coupled to said ferrule and forming a cable junction; and a strain relief collar at an end of said housing opposite said ferrule, said collar comprising means for transferring stress from said cable junction to said housing.

31. The probe of claim 30 wherein said stress transferring means comprises:

a deformable portion of said housing for exerting radial compression forces.

32. The probe of claim 28 wherein said ferrule is rotationally displaceable, said probe further comprising:

a grip coupled to said housing and being rotationally displaceable, said grip comprising means for constraining rotation of said ferrule from a fixed position.

33. The probe of claim 32 wherein said rotational constraining means is longitudinally displaceable, said rotational constraining means comprises:

an interlock coupled to said housing, said interlock comprising means for constraining longitudinal displacement of said grip.

34. The probe of claim 28 wherein said ferrule is longitudinally displaceable and said retaining ring having a flange abutting a surface of said raised shoulder, said probe further comprising:

a spring biasing said raised shoulder against said flange, said spring comprising means for constraining longitudinal displacement of said ferrule from a fixed position.

35. The probe of claim 1 wherein said ferrule having an arcuate collar, said transverse constraining means comprises:

a split socket having an interior arcuate surface mating with said arcuate collar.

36. The probe of claim 35 wherein said transverse constraining means further comprises:

an annular compressible means disposed adjacent said ferrule restoring said socket to a coaxial relation with said gimbal.

37. The probe of claim 35 further comprising:

a housing coupled to said split socket;

a fiber optic cable coupled to said ferrule and forming a cable junction; and a strain relief collar at an end of said housing opposite said ferrule, said collar comprising means for transferring stress from said cable junction to said housing.

38. The probe of claim 37 wherein said stress relief means comprises:

a deformable portion of said housing exerting radial compression forces.

39. The probe of claim 35 wherein said ferrule is rotationally displaceable, said probe further comprising:

a housing coupled to said split socket; and a grip coupled to said housing and being rotationally displaceable, said grip comprising means for constraining rotation of said ferrule from a fixed position.

40. The probe of claim 39 wherein said rotational constraining means is longitudinally displaceable, said rotational constraining means comprising:

an interlock coupled to said housing, said interlock comprising means for constraining longitudinal displacement of said grip.

41. The probe of claim 35 wherein said ferrule is longitudinally displaceable, said probe further comprising:

a housing having a flange abutting a surface of said split socket; and a spring biasing said split socket against said flange, said spring comprising means for constraining longitudinal displacement of said ferrule from a fixed position.

42. The probe of claim 1 wherein said ferrule having an arcuate collar, said transverse constraining means comprises:

a housing having an interior arcuate surface mating with said arcuate collar.

43. The probe of claim 42 wherein said transverse constraining means further comprises:

an annular compressible means disposed adjacent said ferrule restoring said ferrule to a coaxial relation to said transverse constraining means.

44. The probe of claim 42 further comprising:

a fiber optic cable coupled to said ferrule and forming a cable junction; and a strain relief collar at an end of said housing opposite said ferrule, said collar comprising means for transferring stress from said cable junction to said housing.

45. The probe of claim 44 wherein said stress relief means comprises:

a deformable portion of said housing exerting radial compression forces.

46. The probe of claim 42 wherein said ferrule is rotationally displaceable, said probe further comprising:

a sleeve coupled to said housing; and a grip coupled to said sleeve and being rotationally displaceable, said grip comprising means for constraining rotation of said ferrule from a fixed position.

47. The probe of claim 46 wherein said rotational constraining means is longitudinally displaceable, said rotational constraining means comprising:

an interlock coupled to said housing, said interlock comprising means for constraining longitudinal displacement of said grip.

48. The probe of claim 47 wherein said longitudinal constraining means comprises:

outwardly facing lips at each end of said sleeve abutting each end of said rotational constraining means.

49. The probe of claim 42 wherein said ferrule is longitudinally displaceable and said housing having a flange, said probe further comprising:

a sleeve coupled to said housing and abutting said flange; and a spring biasing said flange against said sleeve, said spring comprising means for constraining longitudinal displacement of said ferrule from a fixed position.

50. The probe of claim 1 wherein said transverse constraining means comprises:

a ferrule retainer having an exterior arcuate collar; and a housing having an interior arcuate surface mating with said arcuate collar.

51. The probe of claim 50 wherein said transverse constraining means further comprises:

an annular compressible means disposed adjacent said housing restoring said housing to a coaxial relation to said transverse constraining means.

52. The probe of claim 50 further comprising:

a fiber optic cable coupled to said ferrule and forming a cable junction; and a strain relief collar at an end of said housing opposite said ferrule, said collar comprising means for transferring stress from said cable junction to said housing.

53. The probe of claim 52 wherein said stress relief means comprises:

a deformable portion of said housing exerting radial compression forces.

54. The probe of claims 50 wherein said ferrule is rotationally displaceable, said probe further comprising:

a grip coupled to said housing and being rotationally displaceable, said grip comprising means for constraining rotation of said ferrule from a fixed position.

55. The probe of claim 54 wherein said rotational constraining means is longitudinally displaceable, said rotational constraining means comprising:

an interlock coupled to said housing, said interlock comprising means for constraining longitudinal displacement of said grip.

56. The probe of claim 50 wherein said ferrule having a raised shoulder and is longitudinally displaceable, said probe further comprising:

a flange on said ferrule retainer abutting said raised shoulder;

a spring biasing said raised shoulder against said flange, said spring comprising means for constraining longitudinal displacement of said ferrule from a fixed position.

57. A fiber optic test probe, comprising:

a ferrule having a fixable position and being rotationally displaceable; and a grip coupled to said ferrule and being rotationally displaceable, said grip comprising means for constraining rotational displacement of said ferrule from a fixed position.

58. The probe of claim 57 wherein said rotational constraining means is longitudinally displaceable, said rotational constraining means comprising:

a housing coupled to said ferrule; and an interlock coupled to said housing, said interlock means comprising means for constraining longitudinal displacement of said grip.

59. The probe of claim 57 wherein said ferrule is longitudinally displaceable, said probe further comprising:

a spring disposed mediate said ferrule and said grip, said spring comprising means for constraining longitudinal displacement of said ferrule from a fixed position.

* * * * *

UNITED STATES PATENT AND TRADEMARK OFFICE
CERTIFICATE OF CORRECTION

PATENT NO. : 5,661,843
DATED : August 26, 1997
INVENTOR(S) : Rickenbach, et al.

It is certified that error appears in the above-identified patent and that said Letters Patent is hereby corrected as shown below:

In Column 4, line 33, please replace "interaction/" with ---interaction---

In Column 5, line 44, please replace "conventional, mechanical" with ---conventional mechanical---

Signed and Sealed this

Second Day of December, 1997

Attest:

BRUCE LEHMAN

Attesting Officer

Commissioner of Patents and Trademarks